US012751554B2

(12) United States Patent
Su

(10) Patent No.: US 12,751,554 B2
(45) Date of Patent: Oct. 6, 2026

(54) CONVENIENTLY STORABLE CHILDREN HEIGHT-INCREASING STOOL

(71) Applicant: Yu Su, Hangzhou (CN)

(72) Inventor: Yu Su, Hangzhou (CN)

( * ) Notice: Subject to any disclaimer, the term of this patent is extended or adjusted under 35 U.S.C. 154(b) by 0 days.

(21) Appl. No.: 19/378,913

(22) Filed: Nov. 4, 2025

(65) Prior Publication Data

US 2026/0150980 A1 Jun. 4, 2026

(30) Foreign Application Priority Data

Mar. 7, 2025 (CN) ......................... 202520392516.9

(51) Int. Cl.
*A47C 12/00* (2006.01)
*E06C 1/16* (2006.01)
*E06C 7/50* (2006.01)
*A47D 13/00* (2006.01)

(52) U.S. Cl.
CPC ................ *A47C 12/00* (2013.01); *E06C 1/16* (2013.01); *E06C 7/50* (2013.01); *A47D 13/00* (2013.01)

(58) Field of Classification Search
CPC ......... A47C 12/00; A47C 12/02; A47C 13/00; A47D 1/02; A47D 13/00; A47K 13/06; E06C 1/16; E06C 1/20; E06C 7/50; E06C 1/14; E06C 1/18
USPC ........................................................... D6/353
See application file for complete search history.

(56) References Cited

U.S. PATENT DOCUMENTS

| | | | | |
|---|---|---|---|---|
| 271,619 A * | 2/1883 | Flint | E06C 1/20 | 182/177 |
| 1,091,311 A * | 3/1914 | Dybeck | A47C 12/02 | 182/33.5 |
| 2,975,856 A * | 3/1961 | Anderson | E06C 1/20 | 182/161 |
| 4,290,502 A * | 9/1981 | Anderson | A47C 12/02 | 182/125 |
| 4,421,206 A * | 12/1983 | Kummerlin | E06C 1/393 | 182/1 |
| 4,502,564 A * | 3/1985 | Kummerlin | E06C 1/16 | 182/161 |

(Continued)

FOREIGN PATENT DOCUMENTS

| | | | | |
|---|---|---|---|---|
| CN | 213309424 U * | 6/2021 | A47C 13/06 |
| DE | 202013102602 U1 * | 7/2013 | A47D 1/08 |

*Primary Examiner* — Colleen M Chavchavadze
(74) *Attorney, Agent, or Firm* — Hemisphere Law, PLLC

(57) ABSTRACT

The present application relates to a conveniently storable children height-increasing stool, which includes two side plates, at least one support plate connected between the two side plates, a folding assembly having two auxiliary support feet, and a limiting device disposed between the side plates and the folding assembly. The folding assembly can achieve rotational connection with the side plates, the auxiliary support feet can be fully stacked against inner sides or outer sides of the side plates. This significantly reduces the occupied volume, and facilitates upright storage in compact bathroom space or packing into travel bags. It is enabled to form multiple stepped stepping surfaces, which facilitates adaptation to children of different heights and various toilet heights. Furthermore, the folding assembly can form a stable planar support structure together with the side plates, thereby ensuring stability when a child is standing and reducing the risk of tipping.

8 Claims, 4 Drawing Sheets

(56) References Cited

U.S. PATENT DOCUMENTS

| | | | | | |
|---|---|---|---|---|---|
| 5,937,968 | A | * | 8/1999 | Gibson | E06C 1/393 182/129 |
| D1,001,524 | S | * | 10/2023 | Ji | D6/350 |
| D1,024,585 | S | * | 4/2024 | Yao | D6/350 |
| 12,075,910 | B2 | * | 9/2024 | Stultz | A47B 83/00 |
| D1,103,417 | S | * | 11/2025 | Lin | D6/350 |
| 2008/0303322 | A1 | | 12/2008 | Young | |
| 2021/0189800 | A1 | | 6/2021 | Hradisky | |
| 2022/0290498 | A1 | | 9/2022 | Hradisky | |

* cited by examiner

CONVENIENTLY STORABLE CHILDREN HEIGHT-INCREASING STOOL

CROSS-REFERENCE TO RELATED APPLICATIONS

The present application claims priority of Chinese patent application CN 202520392516.9, filed on Mar. 7, 2025, which is incorporated herein by reference in its entirety.

TECHNICAL FIELD

The present application relates to the technical field of height elevation equipment, and more particularly, to a conveniently storable children height-increasing stool.

BACKGROUND ART

In the field of children's bathroom products, children's step stools serve as essential tools to assist children in safely using adult toilets. Their design must balance stability, storage convenience, and adaptability to various scenarios. However, most products in the prior art have non-foldable rigid structural designs, which result in limited application scenarios and complicate storage, and fail to meet modern households' demands for space efficiency and portability.

A type of conventional stepped elevation stool rigidly fixes pedals to a frame using rivets to form a stable two-tier stepped structure. While this design excels in load-bearing capacity and resistance to deformation, the permanent connection manner of the rivets render the whole structure non-foldable entirely. For households with limited bathroom space, such step stools require occupying fixed positions over extended periods, which encroaches on constrained spaces and disrupts movement flow of daily use. In travel scenarios, their fixed dimensions causes compressing and storage to be impossible, making them impractical to pack into luggage or carry-on bags. Consequently, families are forced to forgo bringing them during trips or visits, thereby increasing safety risks (such as slipping or improper postures) when children use adult toilets.

Specific problems caused by the non-foldable nature includes the follows.

1. Spatial occupation conflict: space of household bathrooms is usually compact. Non-foldable toilet stools must be stored in a fixed area for along time and compete for space with toiletries, cleaning tools, and the like, thereby reducing space utilization efficiency.
2. Lack of portability: during travel, the fixed volumes and shapes of the products prevent them from conforming to luggage size restriction and lead to difficulty in carrying. This limits convenience and safety of children using toilets outside the home.
3. Functional singularity: existing designs often focus solely on the elevation function, but fail to integrate folding or height adjustment modules. Consequently, they cannot dynamically adapt to children's growth or different toilet heights, thus practicality is limited.

Furthermore, although some improved designs attempt to optimize storage through nesting structures or modular components, volume reduction after nesting is limited, and they rely on complex limiting mechanisms, operation is cumbersome and it is difficult to achieve rapid folding and lightweight portability.

Therefore, on the premise of ensuring load-bearing safety and stability, how to overcome the structural limitation of the prior art and develop a children's toilet stool, which can be quickly folded for convenient storage and further integrate a height adjustment function to adapt to children's growth and diverse toilet dimensions, has become a technical problem that urgently requires to be solved in this field.

SUMMARY

The technical problem to be solved by the present application is: aiming at aforementioned prior art, providing a children height-increasing stool that can be quickly folded for conveniently storing and carrying.

In order to solve above technical problem, the present application adopts technical solutions as follows.

A conveniently storable children height-increasing stool comprises: two side plates arranged opposite to each other; at least one support plate connected between the two side plates to provide a stepping surface; a folding assembly comprising two auxiliary support feet arranged opposite to each other; and a limiting device disposed between the side plates and the folding assembly; wherein the two auxiliary support feet are respectively rotatably connected to end faces of the two side plates, thereby enabling the folding assembly to switch between an unfolded state and a folded state relative to the side plates; when the folding assembly is in the unfolded state, the limiting device locks the folding assembly in an unfolded position, so that the auxiliary support feet and the side plates cooperatively form a planar support structure; when the folding assembly is in the folded state, the auxiliary support feet stack against outer or inner sides of the side plates to reduce occupied volume.

In order to enable the two auxiliary support feet to achieve linkage and further achieve synchronously unfolding or synchronously folding actions, thereby improving operational convenience, it is preferable that the folding assembly further includes a connecting rod, two ends of the connecting rod are fixedly connected to inner end faces of the two auxiliary support feet respectively to synchronously drive unfolding or folding actions of the two auxiliary support feet.

In order to simultaneously meet usage needs of children of different age groups and expand the product's application scope, it is preferable that the number of the support plates is two or more, and the support plates are respectively horizontally connected between the side plates at different heights to form multiple vertically spaced stepping surfaces.

In order to ensure that contact between children's feet and the stepping surfaces is more comfortable and ascending and descending from the steps are more natural and convenient during use, it is preferable that two side edges of each side plate are respectively provided with an outer arc edge and an inner arc edge; the outer arc edge features a convex profile, and the inner arc edge features a concave profile; each end of each support plate is horizontally connected to an area between the outer arc edge and the inner arc edge of a corresponding side plate, and the support plates are arranged to be vertically spaced along extending directions of the outer arc edges; height differences between adjacent support plates are adapted to curvatures of the outer arc edges, thereby enabling the support plates to form ergonomically contoured stepped stepping surfaces.

In order to optimize the connection structure between the support plates and the side plates and ensure secure connection to guarantee products' stability, it is preferable that ends of each support plate are provided with transversely extending first threaded holes, and corresponding positions on the side plates are provided with first mounting holes allowing fasteners to pass through transversely; the support plates are fixed to the side plates by fasteners passing through the first mounting holes and subsequently being screwed into the first threaded holes.

In order to better achieve rotatable connection between the auxiliary support feet and the side plates and further adjusting rotational tightness of the auxiliary support feet conveniently, it is preferable that a fixing knob is further included; the fixing knob is provided with a threaded post, each auxiliary support foot is provided with a transversely extending hinge hole, each side plate is provided with a second mounting hole aligned with the hinge hole, and an end of at least one support plate is further provided with a transversely extending second threaded hole; the threaded post sequentially passes through the hinge hole and the second mounting hole and then is screwed into the second threaded hole to rotatably securing the auxiliary support foot to the side plate.

In order to optimize the limiting structure of the limiting device and enable it to utilize existing components and structures to achieve rotational limitation of the folding assembly and thereby reduce production cost, it is preferable that the limiting device comprises the aforementioned connecting rod; when the folding assembly is in the unfolded state, a corresponding side portion of the connecting rod abuts against the inner arc edge of the side plate, thereby restricting the folding assembly from rotating further towards the unfolding direction and forming rotational limitation.

In order to facilitate carrying and transportation of the children height-increasing stool and thereby enhance product portability, it is preferably that a top of each side plate is provided with a through hole, the through hole penetrates a thickness direction of the side plate to form a handle structure for grasping.

In order to improve comfort during carrying, it is preferable that a top contour of the through hole is outwardly arched, and an arched gripping section is formed between the through hole and the outer arc edge of the side plate, resulting in a slender and easy-to-hold handle structure.

Compared with the prior art, the present application offers the following advantages: by providing the folding assembly and enabling the folding assembly to achieve rotational connection with the side plates, the auxiliary support feet can be fully stacked against inner sides or outer sides of the side plates. This significantly reduces the occupied volume, and facilitates upright storage in compact bathroom space or packing into travel bags, thereby resolving the problems of "spatial occupation conflict" and "lack of portability" in the prior art. By providing the multiple vertically spaced support plates on the side plates, it is enabled to form multiple stepped stepping surfaces, which facilitates adaptation to children of different heights and various toilet heights, thereby dynamically accommodating requirement of children's growth. Furthermore, by providing the ingenious limiting device, the folding assembly can be securely locked onto the side plates in the unfolded state without requiring arrangement of additional components, and can form a stable planar support structure together with the side plates, thereby ensuring stability when a child is standing and reducing the risk of tipping.

DETAILED DESCRIPTION OF THE EMBODIMENTS

Figure 1:
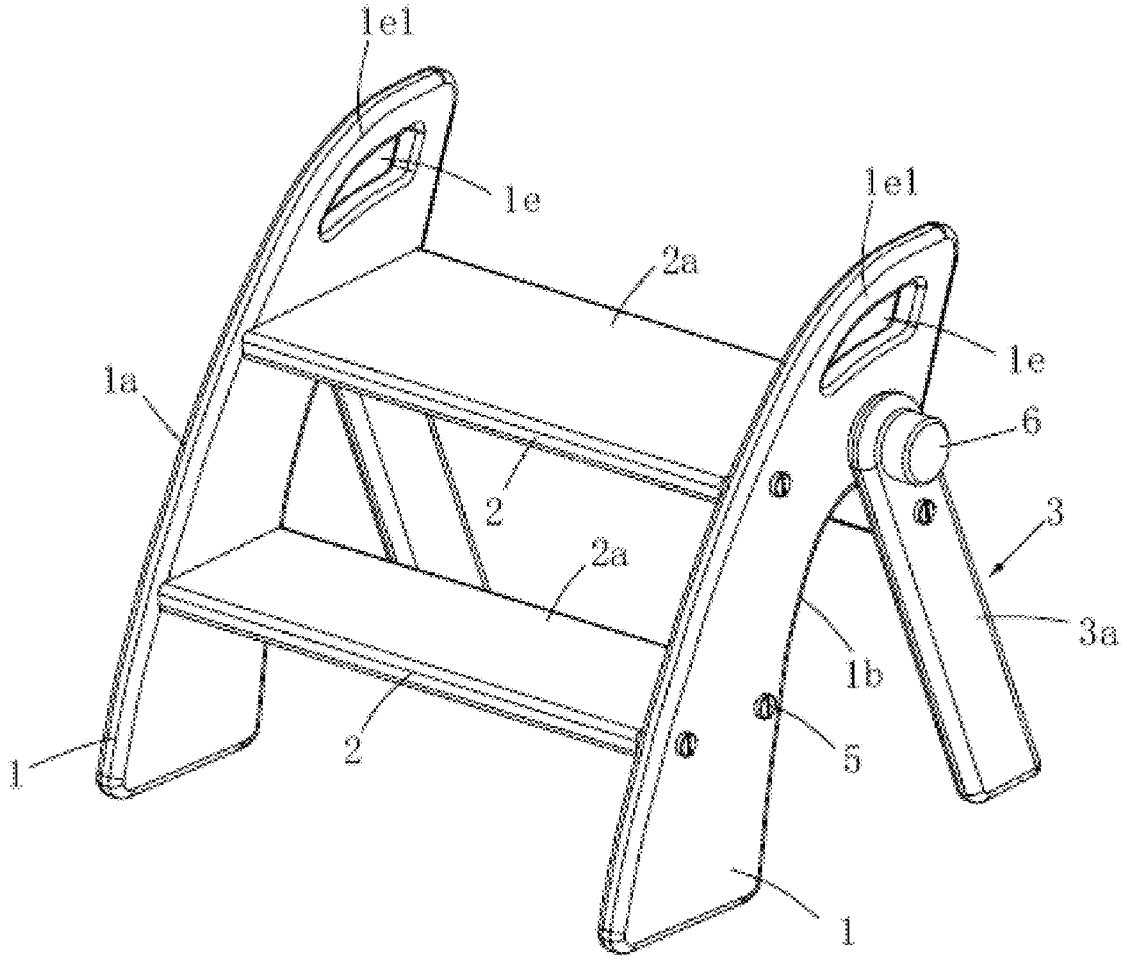
FIG. 1 is a perspective structural schematic view of an embodiment of the present application.

The present application is further described in detail below in conjunction with drawings and embodiments.

FIGS. 1-4 show schematic views of an embodiment of the present application. This embodiment provides a conveniently storable children height-increasing stool, which mainly includes two side plates 1, at least one support plate 2, a folding assembly 3, and a limiting device 4.

In particular, the conveniently storable children height-increasing stool includes: two side plates 1 arranged opposite to each other; at least one support plate 2 connected between the two side plates 1 to provide a stepping surface 2*a*; a folding assembly 3 including two auxiliary support feet 3*a* arranged opposite to each other; and a limiting device 4 disposed between the side plates 1 and the folding assembly 3; wherein the two auxiliary support feet 3*a* are respectively rotatably connected to end faces of the two side plates 1, thereby enabling the folding assembly 3 to switch between an unfolded state and a folded state relative to the side plates 1; when the folding assembly 3 is in the unfolded state, the limiting device 4 locks the folding assembly 3 in an unfolded position, so that the auxiliary support feet 3*a* and the side plates 1 cooperatively form a planar support structure; when the folding assembly 3 is in the folded state, the auxiliary support feet 3*a* stack against outer or inner sides of the side plates 1 to reduce occupied volume.

In order to enable the two auxiliary support feet 3*a* to achieve linkage and further achieve synchronously unfolding or synchronously folding actions, thereby improving operational convenience, it is preferable that the folding assembly 3 further includes a connecting rod 3*b*, two ends of the connecting rod 3*b* are fixedly connected to inner end faces of the two auxiliary support feet 3*a* respectively to synchronously drive unfolding or folding actions of the two auxiliary support feet 3*a*.

In order to simultaneously meet usage needs of children of different age groups and expand the product's application scope, it is preferable that the number of the support plates 2 is two or more, and the support plates 2 are respectively horizontally connected between the side plates 1 at different heights to form multiple vertically spaced stepping surfaces 2*a*.

In order to ensure that contact between children's feet and the stepping surfaces 2*a* is more comfortable and ascending and descending from the steps are more natural and convenient during use, it is preferable that two side edges of each side plate 1 are respectively provided with an outer arc edge 1*a* and an inner arc edge 1*b*; the outer arc edge 1*a* features a convex profile, and the inner arc edge 1*b* features a concave profile; each end of each support plate 2 is horizontally connected to an area between the outer arc edge 1*a* and the inner arc edge 1*b* of a corresponding side plate 1, and the support plates 2 are arranged to be vertically spaced along extending directions of the outer arc edges 1*a*; height differences between adjacent support plates 2 are adapted to curvatures of the outer arc edges 1*a*, thereby enabling the support plates 2 to form ergonomically contoured stepped stepping surfaces 2*a*.

In order to optimize the connection structure between the support plates 2 and the side plates 1 and ensure secure connection to guarantee products' stability, it is preferable that ends of each support plate 2 are provided with transversely extending first threaded holes 2*b*, and corresponding positions on the side plates 1 are provided with first mounting holes 1*c* allowing fasteners 5 to pass through transversely; the support plates 2 are fixed to the side plates 1 by fasteners 5 passing through the first mounting holes 1*c* and subsequently being screwed into the first threaded holes 2*b*.

In order to better achieve rotatable connection between the auxiliary support feet 3*a* and the side plates 1 and further adjusting rotational tightness of the auxiliary support feet 3*a* conveniently, it is preferable that the conveniently storable children height-increasing stool further includes a fixing knob 6; the fixing knob 6 is provided with a threaded post 6*a*, each auxiliary support foot 3*a* is provided with a transversely extending hinge hole 3*a*1, each side plate 1 is provided with a second mounting hole 1*d* aligned with the hinge hole 3*a*1, and an end of at least one support plate 2 is further provided with a transversely extending second threaded hole 2*c*; the threaded post 6*a* sequentially passes through the hinge hole 3*a*1 and the second mounting hole 1*d* and then is screwed into the second threaded hole 2*c* to rotatably securing the auxiliary support foot 3*a* to the side plate 1.

In order to optimize the limiting structure of the limiting device 4 and enable it to utilize existing components and structures to achieve rotational limitation of the folding assembly 3 and thereby reduce production cost, it is preferable that the limiting device 4 also includes the aforementioned connecting rod 3*b*; when the folding assembly 3 is in the unfolded state, a corresponding side portion of the connecting rod 3*b* abuts against the inner arc edge 1*b* of the side plate 1, thereby restricting the folding assembly 3 from rotating further towards the unfolding direction and forming rotational limitation.

In order to facilitate carrying and transportation of the children height-increasing stool and thereby enhance product portability, it is preferably that a top of each side plate 1 is provided with a through hole 1*e*, the through hole 1*e* penetrates a thickness direction of the side plate 1 to form a handle structure for grasping.

In order to improve comfort during carrying, it is preferable that a top contour of the through hole 1*e* is outwardly arched, and an arched gripping section 1*e*1 is formed between the through hole 1*e* and the outer arc edge 1*a* of the side plate 1, resulting in a slender and easy-to-hold handle structure.

A specific implementation process of the conveniently storable children height-increasing stool will be introduced in detail below. It includes specific structures of aforementioned elements and connection manners among them.

Figure 2:
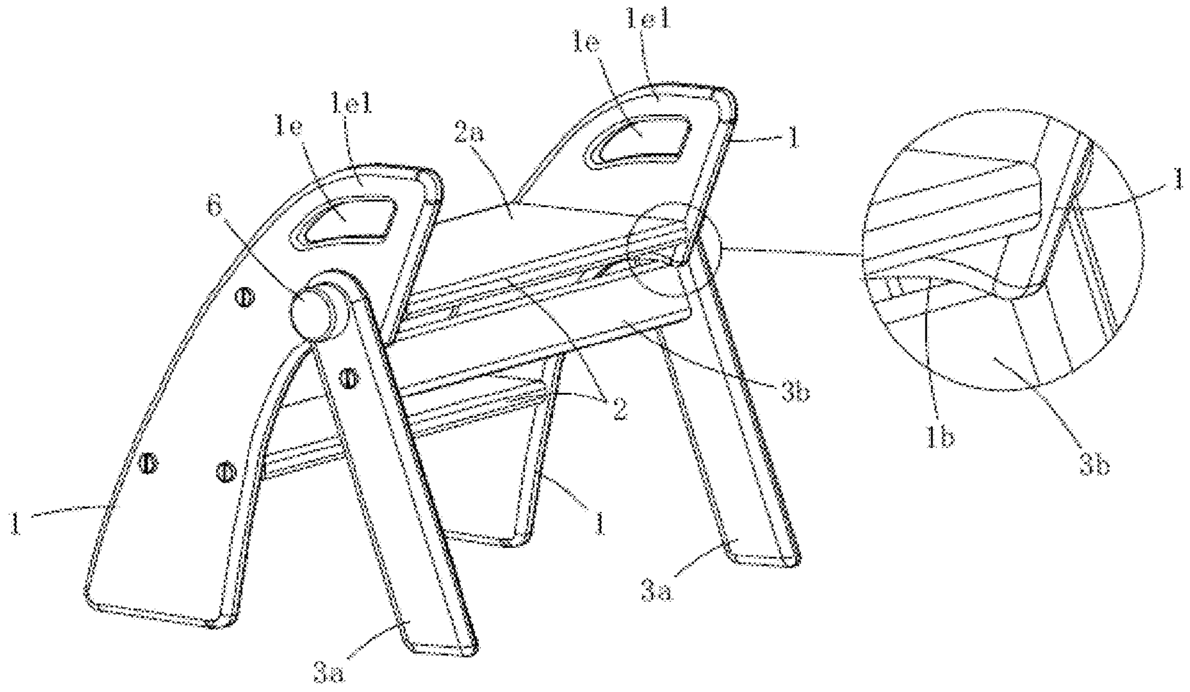
FIG. 2 is a perspective structural schematic view of an embodiment of the present application, from another view angle.
Figure 3:
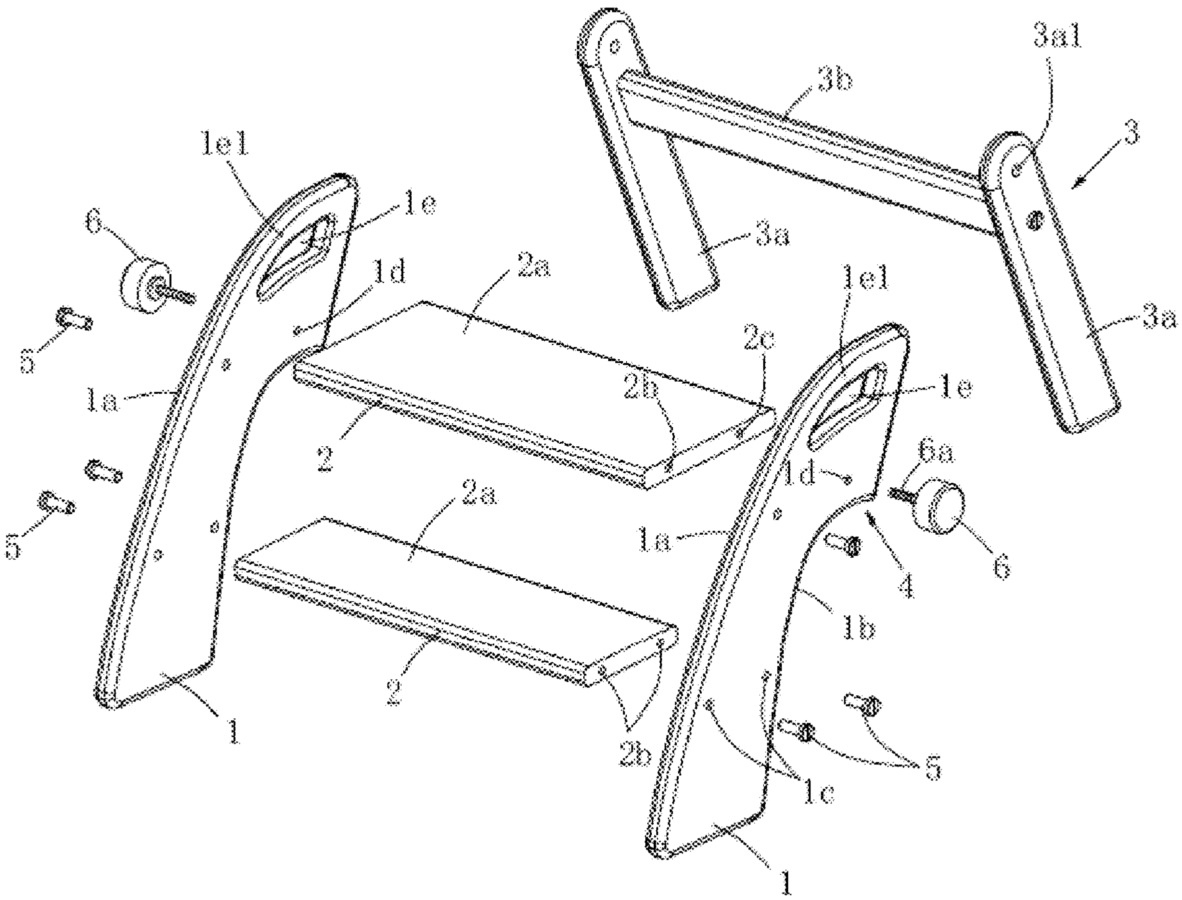
FIG. 3 is a structural schematic view of an embodiment of the present application, in a disassembled state.

Processing and preparation of the side plate 1: referring to FIGS. 1-3, during manufacturing of each side plate 1, the outer arc edge 1*a* and the inner arc edge 1*b* are respectively formed on two side edges of the side plate 1. The outer arc edge 1*a* is convexly curved outward, while the inner arc edge 1*b* is concavely curved inward. This design considers the overall aesthetics, facilitates the subsequent installation of other components, and improves the structural strength of the side plate 1. Multiple holes need to be machined in the side plate 1. The first mounting holes 1*c* are drilled at positions corresponding to the connection points with the support plates 2, these holes 1*c* are laterally distributed, and their diameters are precisely determined based on dimensions of the subsequently used fasteners 5, thereby ensuring tight fit between them. The second mounting holes 1*d* are drilled at locations for connecting with the auxiliary support feet 3*a*. The concentricity requirement between the second mounting holes 1*d* and the hinge holes 3*a*1 on the auxiliary support feet 3*a* is very high, so as to guarantee smooth rotation of the auxiliary support feet 3*a*. Furthermore, the through hole 1*e* penetrating the thickness direction of the side plate 1 is drilled at the top of the side plate 1. The top contour of the through hole 1*e* is machined into an outward arc shape using a specialized cutting process. During machining, the arched gripping section 1*e*1 is formed between the through hole 1*e* and the outer arc edge 1*a*, thereby constituting a slender and easy-to-hold handle structure that facilitates users in carrying the height-increasing stool.

Fabrication and installation of the support plate 2: referring to FIGS. 1-3, the number of the support plates 2 is determined according to actual design requirements. In this embodiment, the number is two, but it can also be set to be more according to actual requirements. A transversely extending first threaded hole 2*b* and a second threaded hole 2*c* are machined at each end of every support plate 2, the first threaded hole 2*b* is used for connecting with the side plate 1, while the second threaded hole 2*c* is used for installing structures related to the auxiliary support foot 3*a*. During installation, first, the two support plates 2 are respectively positioned horizontally between the two side plates 1. Their positions are carefully adjusted so that the first threaded holes 2*b* at the ends of the support plates 2 align precisely with the corresponding first mounting holes 1*c* on the side plates 1. Then, appropriate fasteners 5, such as bolts or screws, are selected. The bolts are inserted from the outside of the side plates 1 through the first mounting holes 1*c* and then screwed into the first threaded holes 2*b*. During tightening the bolts, a torque wrench is used and operated according to a specified torque value, thereby ensuring the support plates 2 are securely fixed to the side plates 1 at different heights. The support plates 2 are arranged vertically and spacedly along the extending direction of the outer arc edge 1*a*. The height difference between adjacent support plates 2 is precisely calculated to match the curvature of the outer arc edge 1*a*, thereby forming an ergonomic stepped stepping surface 2*a* that facilitates ascent and descent for children.

Assembly and installation of the folding assembly 3: referring to FIGS. 1-4, the folding assembly 3 includes two auxiliary support feet 3*a*, each auxiliary support foot 3*a* needs to be machined with a transversely extending hinge hole 3*a*1. The connecting rod 3*b* is fabricated as a rod-shaped structure, and its two ends are respectively fixed via screw bolt connection to the inner end faces of the two auxiliary support feet 3*a*, thereby ensuring robust and reliable connection among them, such that the connecting rod 3*b* can synchronously drive unfolding and folding actions of both auxiliary support feet 3*a*. The hinge holes 3*al* of the auxiliary support feet 3*a* of the assembled folding assembly 3 are aligned with the second mounting holes 1*d* on the side plates 1, and the fixing knob 6 are used for installation. Each fixing knob 6 is provided with a threaded post 6*a*. The threaded post 6*a* is inserted from the outside of the side plate 1, sequentially passes through the second mounting hole 1*d* and the hinge hole 3*a*1, and then is screwed into the second threaded hole 2*c* at the end of the support plate 2. During screwing in the fixing knob 6, an angle of a corresponding auxiliary support foot 3*a* is appropriately adjusted to ensure free rotation thereof, thereby guaranteeing smooth switching of the folding assembly 3 between the unfolded and folded states. In the unfolded state, the auxiliary support feet 3*a* and the side plates 1 together form a stable planar support structure. In the folded state, the auxiliary support feet 3*a* stack against the outer or inner sides of the side plates 1 to achieve volume reduction and facilitate storage. The folding assembly 3 is locked onto the side plates 1 by tightening the fixing knobs 6 in either the unfolded state or the folded state.

Figure 4:
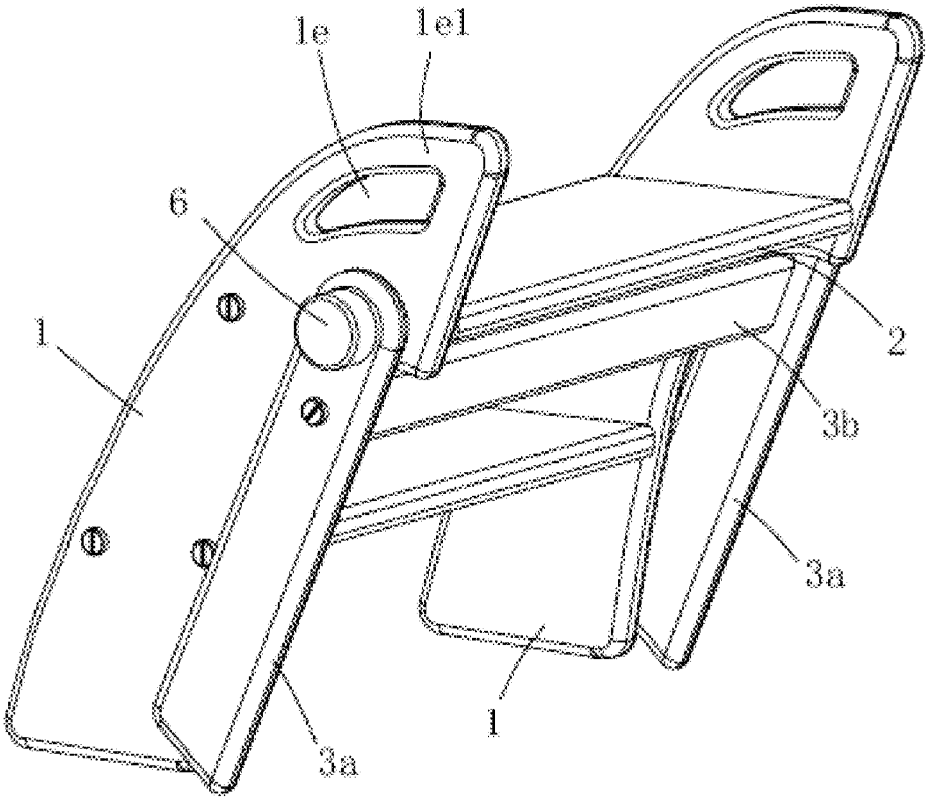
FIG. 4 is a perspective structural schematic view of an embodiment of the present application, in a folded state.

Adjustment and installation of the limiting device 4: referring to FIG. 2 and FIG. 4, in this embodiment, the limiting device 4 is mainly realized by cooperation between the connecting rod 3*b* and the inner arc edge 1*b* of the side plate 1. When the folding assembly 3 is unfolded to approach a preset position, a corresponding side portion of the connecting rod 3*b* can come into tight contact with the inner arc edge 1*b* of the side plate 1, so as to restrict further rotation of the folding assembly 3 towards the unfolded direction, thereby forming reliable rotational limit. This ensures that the auxiliary support feet 3*a* and the side plates 1 together form a stable planar support structure. In this embodiment, the folding assembly 3 can be securely locked onto the side plates 1 in the unfolded state without requiring arranging any additional components, and can form the stable planar support structure together with the side plates 1, thereby ensuring stability when a child is standing and reducing the risk of tipping.

It should be noted that in the description of this embodiment, orientations or positional relationships indicated by terms such as “front”, “rear”, “left”, “right”, “inner”, “outer”, “upper”, “lower”, and the like are all based on the orientations or positional relationships shown in the accompanying drawings. These terms are merely used to facilitate the description of the present application and to simplify the description, and are not intended to indicate or imply that the referred devices or elements must have specific orientations or be constructed and operated in specific orientations. Therefore, they should not be construed as limiting the present application. The terms “install”, “connect”, “couple”, and the like should be interpreted broadly. For example, a connection may be a fixed connection, and may also be a detachable connection, or an integral connection; it may be a direct connection, and may also be an indirect connection through an intermediate medium, or an internal communication between two components. Those of ordinary skill in the art can understand specific meanings of these terms in the present application based on the specific context.

What is claimed is:

1. A conveniently storable children height-increasing stool, comprising:

two side plates (1) arranged opposite to each other;

at least one support plate (2) connected between the two side plates (1) to provide a stepping surface (2*a*);

a folding assembly (3) including two auxiliary support feet (3*a*) arranged opposite to each other; and a limiting device (4) formed by cooperation of the side plates (1) and the folding assembly (3);

wherein the two auxiliary support feet (3*a*) are respectively rotatably connected to end faces of the two side plates (1), thereby enabling the folding assembly (3) to switch between an unfolded state and a folded state relative to the side plates (1); when the folding assembly (3) is in the unfolded state, the limiting device (4) locks the folding assembly (3) in an unfolded position, so that the auxiliary support feet (3*a*) and the side plates (1) cooperatively form a planar support structure; when the folding assembly (3) is in the folded state, the auxiliary support feet (3*a*) stack against outer or inner sides of the side plates (1) to reduce occupied volume;

wherein the conveniently storable children height-increasing stool further comprises a fixing knob (6); the fixing knob (6) is provided with a threaded post (6*a*), each auxiliary support foot (3*a*) is provided with a transversely extending hinge hole (3*a*1), each side plate (1) is provided with a second mounting hole (1*d*) aligned with the hinge hole (3*a*1), and an end of at least one support plate (2) is further provided with a transversely extending second threaded hole (2*c*); the threaded post (6*a*) sequentially passes through the hinge hole (3*a*1) and the second mounting hole (1*d*) and then is screwed into the second threaded hole (2*c*) to rotatably secure the auxiliary support foot (3*a*) to the side plate (1).

2. The conveniently storable children height-increasing stool according to claim 1, wherein the folding assembly (3) further comprises a connecting rod (3*b*), two ends of the connecting rod (3*b*) are fixedly connected to inner end faces of the two auxiliary support feet (3*a*) respectively.

3. The conveniently storable children height-increasing stool according to claim 1, wherein the number of the support plates (2) is two or more, and the support plates (2) are respectively horizontally connected between the side plates (1) at different heights to form multiple vertically spaced stepping surfaces (2*a*).

4. The conveniently storable children height-increasing stool according to claim 3, wherein two side edges of each side plate (1) are respectively provided with an outer arc edge (1*a*) and an inner arc edge (1*b*); each end of each support plate (2) is horizontally connected to an area between the outer arc edge (1*a*) and the inner arc edge (1*b*) of a corresponding side plate (1), and the support plates (2) are arranged to be vertically spaced along extending directions of the outer arc edges (1*a*); a height difference between adjacent support plates (2) is adapted to a curvature of the outer arc edge (1*a*), thereby enabling the support plates (2) to form ergonomically contoured stepped stepping surfaces (2*a*).

5. The conveniently storable children height-increasing stool according to claim 1, wherein ends of each support plate (2) are provided with transversely extending first threaded holes (2*b*), and corresponding positions on the side plates (1) are provided with first mounting holes (1*c*) allowing fasteners (5) to pass through transversely; the support plates (2) are fixed to the side plates (1) by fasteners (5) passing through the first mounting holes (1*c*) and subsequently being screwed into the first threaded holes (2*b*).

6. The conveniently storable children height-increasing stool according to claim 4, wherein the limiting device (4) also includes the connecting rod (3*b*); when the folding assembly (3) is in the unfolded state, a corresponding side portion of the connecting rod (3*b*) abuts against the inner arc edge (1*b*) of the side plate (1), thereby restricting the folding assembly (3) from rotating further towards the unfolding direction and forming rotational limitation.

7. The conveniently storable children height-increasing stool according to claim 4, wherein a top of each side plate (1) is provided with a through hole (1*e*), the through hole (1*e*) penetrates a thickness direction of the side plate (1) to form a handle structure for grasping.

8. The conveniently storable children height-increasing stool according to claim 7, wherein a top contour of the through hole (1*e*) is outwardly arched, and an arched gripping section (1_e_1) is formed between the through hole (1_e_) and the outer arc edge (1_a_) of the side plate (1), resulting in a slender and easy-to-hold handle structure.

* * * * *